Patented May 13, 1941

2,241,769

UNITED STATES PATENT OFFICE 2,241,769

SULPHONIC ACID DERIVATIVES OF ARYL DIAMINES

Joseph B. Dickey and James G. McNally, Rochester, N. Y., assignors to Eastman Kodak Company, Rochester, N. Y., a corporation of New Jersey No Drawing. Application March 29, 1939, Serial No. 264,852

10 Claims. (Cl. 260—510)

This invention relates to new derivatives of aryl diamines containing at least 1 sulfonic acid group and more particularly to derivatives of ortho- or para-phenylenediamine containing at least one alkyl sulfonic acid group in the amine molecule.

Aryl diamines and derivatives thereof are employed industrially for a number of purposes. For example, these amines are employed in dye manufacture, dyeing, photographic purposes and pharmaceutical purposes. Para-phenylenediamine and its derivatives, as is known, may be employed for both black and white and color photographic-developing. It is therefore apparent that the provision of new derivatives of aryl amines which may be employed for these numerous industrial purposes with equivalent or superior results is a desirable accomplishment.

We have discovered new derivatives of aryl diamines and methods for their manufacture, which new products may be employed in any of the ways derivatives of aryl diamines have heretofore been employed. In addition, our new products possess certain inherent solubility characteristics and other properties rendering them particularly useful for purposes wherein they may to some extent contact skin or tissues.

This invention has for one object to provide new derivatives of aryl diamines containing at least one alkyl sulfonic acid group, or metal salt thereof, in its molecule. Another object is to provide new phenylenediamine compounds which include a sulfonic acid group in the molecule. Still another object is to provide new sulfonic acid derivatives of naphthalenediamines. Still another object is to provide new sulfonic acid derivatives of aryl diamines which may be employed as intermediates for preparing indophenol dyes, azo dyes, anthraquinone dyes, photographic developers, anti-oxidants and for other industrial puposes.

A still further object is to provide novel processes for preparing the aforementioned derivatives of aryl diamines. Other objects will appear hereinafter.

We have found, for example, that ortho- and para-arylenediamines having the general formula:

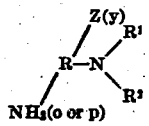

where R is a benzene or naphthalene nucleus; $R^1$ is an organic radical containing two or more carbon atoms and which contains a

group; $R^2$ in addition to $R^1$ may be hydrogen, substituted or unsubstituted alkyl, alkylene, aryl, cycloalkyl or heterocyclic; Z is a monovalent substituent; B is amino or derivative and hydroxyl or derivate, may be prepared by the following procedures which are generically described hereinafter. The resultant arylenediamines as already indicated, may be used for the various purposes for which phenylenediamines have heretofore been used, with improved results in many instances.

These compounds may be prepared as indicated below:

I.
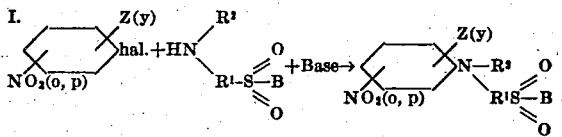

II.
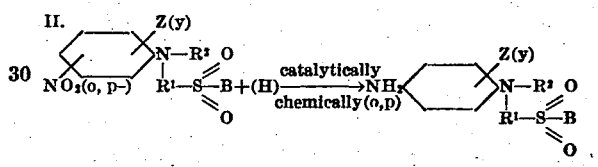

III.
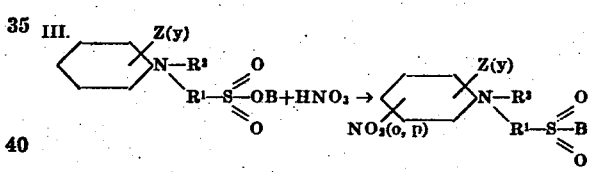

Then reduce as in II.

IV.
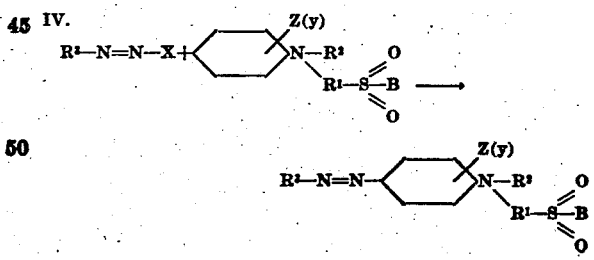

Then reduce as in II.

V.

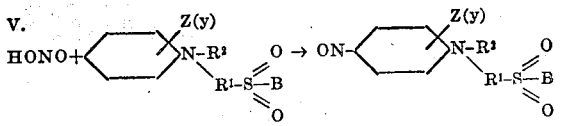

Then reduce as in II.

VI.

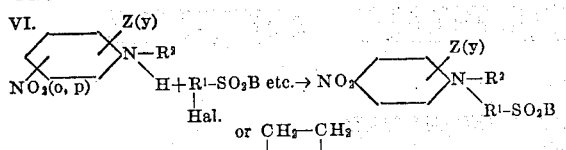

Then reduce as in II.

VII.

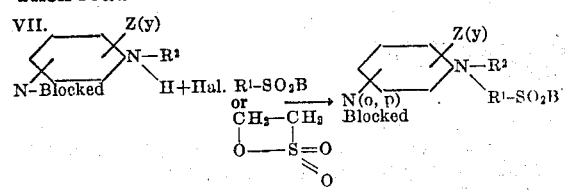

Then hydrolyze.

VIII.

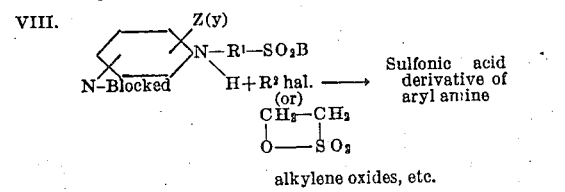

Then hydrolyze.

IX.

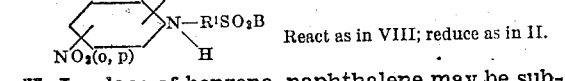

React as in VIII; reduce as in II.

X. In place of benzene, naphthalene may be substituted in any of the above generically described processes.

For a more detailed understanding of our invention, reference is made to the following examples which illustrate certain of our preferred embodiments:

*Example I.—Preparation of p-aminophenylmethyl taurine sodium salt*

Approximately 95 gr. of phenylmethyl taurine was dissolved in 500 cc. of water and 50 cc. of sulfuric acid was added. Thereafter there was added below the surface of the solution (with stirring) approximately 30 gr. of sodium nitrite in 75 cc. of water. A temperature between about 5°–8° C. was maintained and a greenish-yellow solid separated. The mixture was stirred for at least ¾ hr. and subjected to a neutralization treatment with sodium carbonate. The compound, p-nitrosophenylmethyl taurine sodium salt, was separated from the mixture by filtration.

Approximately .08 mol of this nitroso derivative in 160 cc. of water was placed in a shaking autoclave and hydrogenated in the presence of 5 gr. of a nickel catalyst (from a nickel alloy) at between 40°–55° C. The reduction was complete in a few hours (about 2½ hrs. in this example) and the brownish solution removed from the autoclave. The nickel may be recovered from the solution by filtration, for example, and the solution treated with carbon black and filtered. This solution essentially comprising p-aminophenylmethyl taurine sodium salt may be used as such. However, if it is desired to obtain the concentrated product, this may be done by concentrating the solution to dryness and extracting with absolute alcohol. It is, of course, apparent that the sodium salt may readily be converted to the acid, or to other metal salts.

*Example II.—Preparation of p-aminophenyl taurine*

Approximately 36 gr. of p-phenylenediamine and 71 gr. of β-bromoethane sodium sulfonate were heated together in a flask protected from the atmosphere, at a temperature between 150°–170° C. for approximately 8 hours. The product resulting was dissolved in water and extracted with ether and benzene for removing unreacted p-phenylenediamine. The solution was then subjected to a decolorization treatment, as for example with activated carbon, to remove at least a part of the color.

The solution resulting containing the aforementioned p-aminophenyl taurine may be employed as such or the solid compound may readily be obtained by concentrating the aforementioned solution to dryness and extracting with absolute ethanol. The product may in some instances include small amounts of

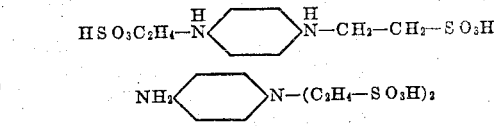

*Example III.—Preparation of p-aminophenylethyl taurine sodium salt*

Approximately 49 gr. of phenylethyl taurine sodium salt was nitrosolated as in Example I. The product was then reduced by adding 20 gr. of zinc dust and 80 cc. of hydrochloric acid, keeping the temperature to below 30° C. The product was neutralized with sodium hydroxide, evaporated to dryness and extracted with ethanol for removing the p-aminophenylethyl taurine.

*Example IV.—p-aminophenylbutyl taurine sodium salt*

Approximately 90 gr. of chloroaniline was diazotized in the usual manner and coupled, in water solution, with 20 gr. of ethylphenyl taurine sodium salt. The coupling was completed by adding sodium acetate. The resultant product was reduced at 50° C. with hydrogen in the presence of a nickel catalyst as aforementioned. The butyl derivative may be employed in solution or recovered as a solid as already described in the preceding examples.

*Example V*

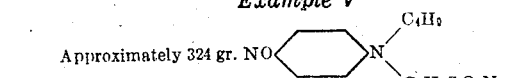

are reacted in 1 l. of chloroform with 210 gr. phosphorus pentachloride by warming on a water bath. When the reaction is complete, the salt is filtered off and the phosphorus oxychloride is removed under reduced pressure. From this compound the desired amides or esters can be prepared by treating the acid chloride with ammonia or derivative or the desired alcohol.

*Example VI*

Approximately 300 gr. of an amide prepared as described above are placed in 1 l. of alcohol with 10 gr. nickel from an alloy and hydrogenated at 50–150° and 2–200 atmospheres pressure. When 2 mols of hydrogen have been added, the reaction is stopped, cooled, and the nickel removed by filtration. The base is recovered by evaporating the alcohol. The compound prepared has the formula:

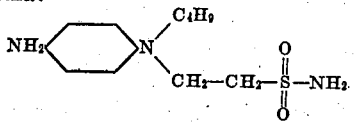

In a similar manner we may prepare:

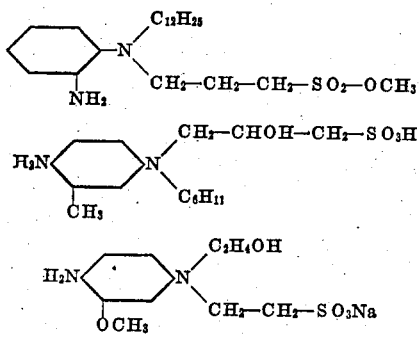

As already pointed out, our novel derivatives of aryl diamines have many uses as for example in dyeing, dye manufacture, photographic and pharmaceutical fields. These derivatives may be employed as couplers or intermediates in the manufacture of indophenol dyes, azo dyes, or anthraquinone dyes, for example. Or, the constituents may be employed in processes wherein the reaction may be caused to take place in the materials being dyed. Or, our new aryl diamines may be employed either alone or in admixture with alkali salts such as sodium carbonate, sodium bisulfate and other conventional ingredients for black and white or color developers. Because of the high reducing activity and the exceptional solubility characteristics inherent in our new aryl diamines, they may be extensively employed as antioxidants and inhibitors in various industrial fields as in the treatment of hydrocarbons, rubber, and the like. Other uses and modifications will be apparent to those skilled in the art. Hence, we do not wish to be restricted in our invention, excepting insofar as is necessitated by the prior art and the spirit of the appended claims.

What we claim and desire to be secured by Letters Patent of the United States is:

1. A process for the manufacture of aryl diamines having at least one sulfonic group in their molecule which comprises reacting a halogenated alkyl sulfonate with an aryl amine which has a reducible nitrogen containing group attached to the nucleus, conducting said reaction in the substantial absence of oxidizing conditions and at a temperature between about 75° C.–400° C., whereby a substituted aryl amine having an amino group containing the alkyl sulfonic group, and said reducible nitrogen group, is obtained, thereafter catalytically hydrogenating said substituted aryl amine for converting said reducible nitrogen group to an amino group.

2. In a process for preparing phenylenediamine derivatives containing a sulfonic group, the step which comprises reacting an aryl amine with a halogenated alkyl sulfonate in the substantial absence of oxidizing conditions and at a temperature between 75° C.–400° C.

3. A process for preparing an aryl diamine sulfonic acid derivative which comprises reacting an aryl diamine with a halogenated alkyl sulfonate alkali metal salt at a temperature between 100° C.–275° C., separating unreacted diamine from the reaction mixture, subjecting the reaction mixture to a decolorizing treatment, and recovering the desired amine by crystallization thereof from an alcoholic solution of the reaction mixture.

4. A process for manufacturing p-aminophenylalkyl taurine alkali metal salt, which comprises preparing p-nitrosophenylalkyl taurine, hydrogenating at least a portion of said nitroso compound in the presence of a metal hydrogenation catalyst and recovering the p-aminophenylalkyl taurine alkali metal salt from the hydrogenation reaction.

5. A process for preparing an aminophenyl taurine, which comprises reacting a phenylenediamine with halogenated alkyl alkali metal sulfonate, separating at least a part of the unreacted diamine and recovering said aminophenyl taurine by crystallization of the reaction mixture from an alcohol solution.

6. A process for the preparation of an aminophenylalkyl taurine alkali metal salt, which comprises converting phenylalkyl taurine sodium salt to a nitroso derivative by reaction of said salt with acid sodium nitrate, isolating at least a part of the nitroso compound and hydrogenating said isolated compound at a temperature below 50° C. to obtain said aminophenylalkyl taurine derivative.

7. As a new compound an aryl diamine derivative having the formula:

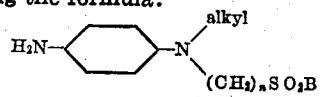

wherein $n$ is at least 2 and B is a member of the group consisting of NaO, NH$_2$ and OCH$_3$.

8. An amine having the formula:

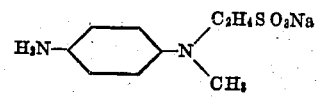

9. An amine having the formula:

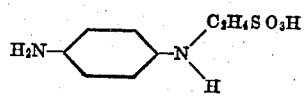

10. An amine having the formula:

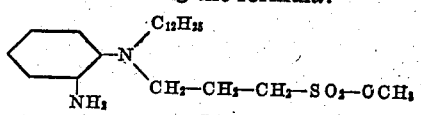

JAMES G. McNALLY.
JOSEPH B. DICKEY.